July 16, 1929.　　　R. D. HOLMES　　　1,721,342
AEROPLANE
Filed Oct. 13, 1927　　　2 Sheets-Sheet 1

INVENTOR.
R. D. Holmes,
BY
ATTORNEYS.

July 16, 1929. R. D. HOLMES 1,721,342
AEROPLANE
Filed Oct. 13, 1927 2 Sheets-Sheet 2
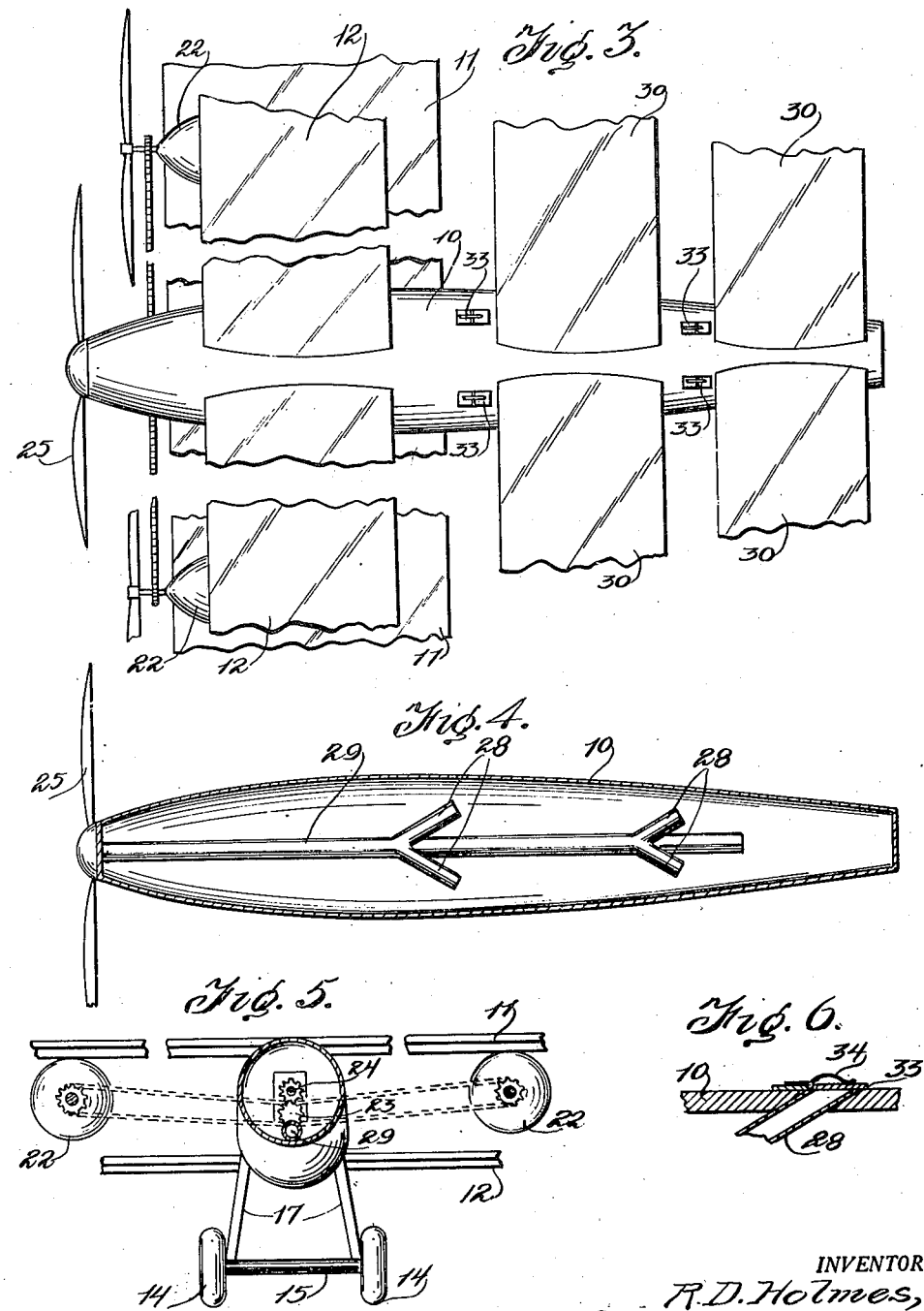
INVENTOR.
R. D. Holmes, Patented July 16, 1929.

1,721,342

UNITED STATES PATENT OFFICE.

RICHARD D. HOLMES, OF HAMTRAMCK, DETROIT, MICHIGAN.

AEROPLANE.

Application filed October 13, 1927. Serial No. 225,995.

This invention relates to an aeroplane.

It is primarily aimed to provide a construction wherein power particularly at the rear end and intermediate its ends is afforded in flight and to aid in the stability of the machine during flight and when landing.

Another object is to provide a novel construction having a tunnel therethrough with branches adapted to discharge air compressed in the tunnel under auxiliary planes to accomplish the end stated.

Additional objects will become apparent from a consideration of the description following taken in connection with accompanying drawings illustrating an operative embodiment.

In said drawings:—

Figure 3 is an inverted plan view of the aeroplane,

Figure 4 is a horizontal sectional view through the aeroplane,

Figure 5 is a detail cross sectional view through the aeroplane,

Figure 6 is a detail sectional view showing one of the automatic valves.

Figure 1:
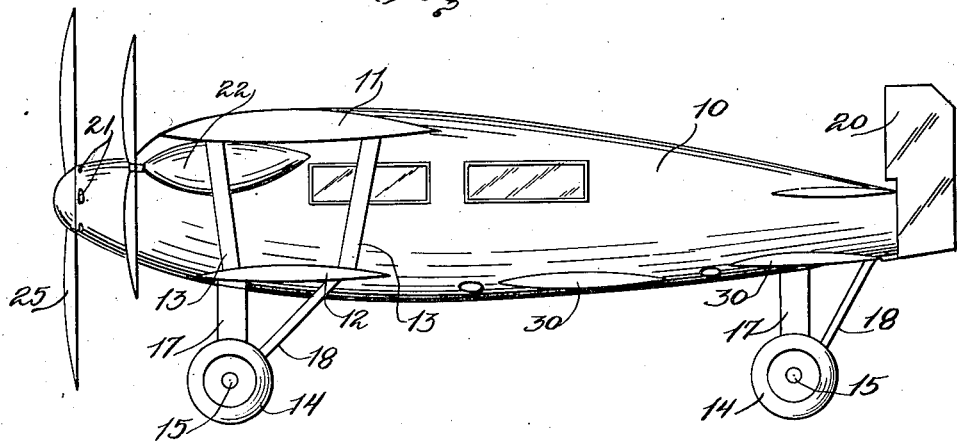
Figure 1 is a side elevation of an aeroplane embodying my invention.
Figure 2:
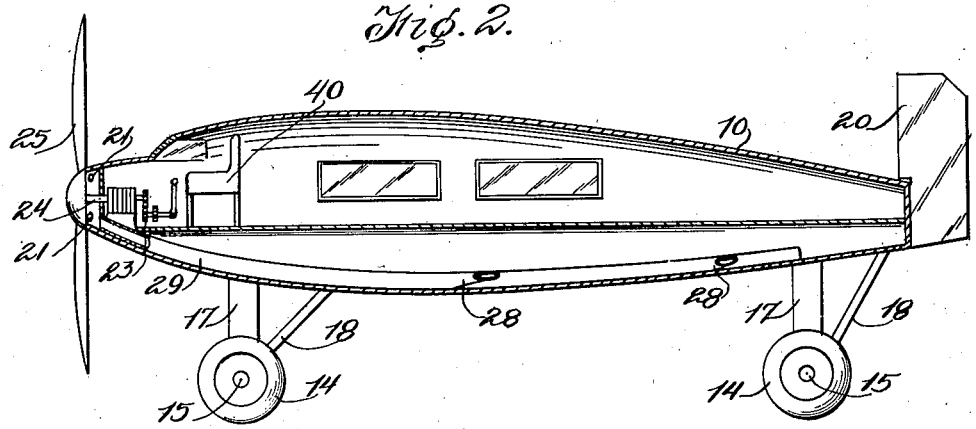
Figure 2 is a vertical longitudinal section.

Referring specifically to the drawings, 10 designates a fuselage which is generally of conventional form and which has connected therewith a main upper plane 11 and a main lower plane 12, joined and reinforced by suitable struts or frame-work 13. The machine has ground wheels at 14 mounted on axles 15 journaled in suitable brackets 17 and reinforced as at 18. A rudder is provided at 20 and is under appropriate control.

The nose portion of the fuselage is preferably pointed as shown and also is perforated as at 21. Propelling motors 22 are mounted on the plane 12 adjacent the outer end thereof and are in driving relation through intermediate gearing 23 with a central shaft 24 carrying a propeller 25. The propeller 25 forces air back into the fuselage through the perforated forward end thereof and through a longitudinally extending duct 29 within said fuselage. From the duct 29 lateral branches 28 lead which extend through the fuselage and discharge the compressed air under and adjacent to auxiliary planes 30 projecting laterally beyond the sides of the fuselage at the bottom thereof. The outlets of such branch tubes or tunnels are closed by plates or valves 33 secured in place by spring hinges 34 which normally maintain them closed, the valves being opened automatically through the compression of the air and its escape therethrough.

A suitable cockpit for the operator is shown at 40.

As a result of the compression of the air through the tunnel and its discharge under or adjacent the auxiliary planes, more power is given the machine at the rear end to assist its flight, elevation and landing, serving to stabilize the machine so as to be safer in use.

It is obvious that the machine will carry suitable accessories and equipment known in the art and which it is unnecessary to specifically describe.

It is obvious that any number of the auxiliary planes may be utilized. Such planes toward the front of the machine are preferably longer and wider than at the rear and they progressively decrease in width and length toward the rear. In actual use such planes may be arranged together with the branch pipes of the tunnel, approximately four feet apart.

Various changes may be resorted to provided they fall within the spirit and scope of the invention.

What is claimed is:—

1. A flying machine having a tunnel in its fuselage, a propeller for the machine directly opposite the intake of the duct to compress air therethrough, a main plane on the fuselage, auxiliary planes on the fuselage rearwardly of the main plane, and branch tunnels leading from the main tunnel to discharge the compressed air rearwardly of the main plane and against said auxiliary planes.

2. A flying mchine having a tunnel in its fuselage, a propeller for the machine directly opposite the intake of the duct to compress air therethrough, a main plane, auxiliary planes on the fuselage rearwardly of the main plane, and branch tunnels leading from the main tunnel to discharge the compressed air against said auxiliary planes, said auxiliary planes decreasing in size progressively from the front toward the rear of the fuselage.

3. A flying machine having a fuselage, a main plane thereon, auxiliary planes thereon rearwardly of the main plane, a tunnel partitioned from the space of the fuselage and located in the lower portion thereof, the nose of the fuselage being perforated, a propeller on the fuselage adjacent said nose to force compressed air therethrough, a duct leading from said nose and having valved communication with the tunnel to receive the compressed air, and said tunnel being arranged to discharge the compressed air adjacent the auxiliary planes for the purpose specified.

In testimony whereof I affix my signature.

RICHARD D. HOLMES.